United States Patent
Fujita et al.

(10) Patent No.: US 6,940,197 B2
(45) Date of Patent: Sep. 6, 2005

(54) ROTARY ELECTRIC MACHINE FOR VEHICLE AND CONTROL DEVICE THEREOF

(75) Inventors: Masahiko Fujita, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/838,305

(22) Filed: May 5, 2004

(65) Prior Publication Data

US 2004/0232793 A1 Nov. 25, 2004

(30) Foreign Application Priority Data

May 20, 2003 (JP) ..................................... P2003-142354

(51) Int. Cl.[7] .............................................. H02K 21/12
(52) U.S. Cl. ..................... 310/156.43; 310/261; 322/50
(58) Field of Search ....................... 310/156.01, 156.34, 310/254, 261, 263; 322/45–50

(56) References Cited

U.S. PATENT DOCUMENTS

| | | | |
|---|---|---|---|
| 3,601,688 A | * | 8/1971 | Dogadko et al. ........... 323/246 |
| 4,431,959 A | * | 2/1984 | Remmers .................... 320/160 |
| 5,672,955 A | * | 9/1997 | Minks .......................... 322/33 |
| 6,281,613 B1 | | 8/2001 | Nakamura et al. |
| 6,707,184 B2 | | 3/2004 | Kusase |

FOREIGN PATENT DOCUMENTS

JP            07-298585       11/1995

* cited by examiner

*Primary Examiner*—Thanh Lam
(74) *Attorney, Agent, or Firm*—Sughrue Mion, PLLC

(57) ABSTRACT

The rotary electric machine includes an armature core constituting a stator having an armature coil for charging a vehicle battery with its output voltage; rotor cores disposed inside the armature core with a predetermined gap therebetween and made up of magnetic pole parts formed as claw poles so that adjacent magnetic poles are different and cylindrical parts carrying a field coil; and permanent magnets provided in the magnetic circuit of the rotor cores for supplying magnetic flux along with the field coil to the armature core. The magnetizing force of the permanent magnets with respect to the armature core is set so that at a predetermined speed the output voltage of the armature coil immediately after a field current passed through the field coil is returned to zero from the maximum magnetizing force exerted by the field current does not exceed the charging voltage of the battery.

7 Claims, 7 Drawing Sheets

ROTARY ELECTRIC MACHINE FOR VEHICLE AND CONTROL DEVICE THEREOF

BACKGROUND OF THE INVENTION

1. Field of the Invention

This invention relates to a charging generator installed in a vehicle, or to a generator/motor for a vehicle, and to a control device thereof, and particularly to constructions for preventing over-charging of a vehicle battery.

2. Background Art

To cope with increased electrical loads in vehicles and to raise fuel economy by reducing weight, increased output and reduced size and weight are being required in charging generators for vehicles, and one way of meeting these requirements is to supplement the magnetic field of the generator with a magnetizing force provided by permanent magnets and thereby reduce leakage flux between the magnetic poles and increase effective flux and increase output. However, in a generator with this kind of construction, even when no field current is passed and the generator operates with the magnetic flux of the permanent magnets only, at high speeds, and when the electrical load is small, it sometimes happens that electrical power exceeding the electrical load is generated, and the battery becomes over-charged and fails or an abnormal voltage is applied to electrical loads and causes them to fail.

In this connection, technologies have been proposed for, in a generator using permanent magnets for its magnetic field, reducing the power generated at high speeds and thereby preventing failure of a battery and electrical loads caused by over-voltage. One example of this is the technology disclosed in Patent Document 1: in the technology disclosed in this document, in a generator having a claw pole type rotor, permanent magnets magnetized in a direction such that they reduce leakage flux inserted between the magnetic poles of the rotor core constituting the field; a clutch is interposed between a pulley driving the rotor and the rotor shaft, and when the internal combustion engine goes above a predetermined speed the clutch outer idles and the clutch inner and the rotor maintain a predetermined speed; and the output voltage of the generator at this predetermined speed is approximately matched to the battery voltage.

And, in Patent Document 2, technology is disclosed wherein, in a generator having a field rotor constructed with permanent magnets, the output of the stator (armature) charges a battery by way of a three-phase full-wave rectifier; the neutral point of the three-phase winding of the armature is grounded via a switching device; this switching device is turned ON and OFF periodically in synchrony with the rotation to repeatedly short-circuit and re-circuit the armature coil and generate a flyback voltage; the battery is charged with this flyback voltage; and the specifications of the field magnets and the armature coil are made such that when there is no ON-OFF switching of the switching device the output voltage of the armature coil does not exceed the battery voltage even at maximum speed.

Further, in Patent Document 3, technology is disclosed wherein, in an alternator for a vehicle having permanent magnets magnetized in a direction such that they reduce leakage flux inserted between the magnetic poles of a claw pole type rotor, when a field current is not supplied to the field coil of the rotor, most of the flux of the permanent magnets is shorted by the armature core and very little flux is supplied to the armature from the magnetic pole faces, and on this basis the specifications of the permanent magnets are adjusted to a magnetizing force such that the generator output at maximum speed when the field current has been made zero is substantially equal to the normal load demand value of the vehicle and does not exceed this.

Patent Document 1:
JP-A-2000-92800 (Para. 4, FIGS. 1 and 2)
Patent Document 2:
JP-A-2002-95175 (Paras. 3 and 4, FIG. 1)
Patent Document 3:
Patent Number 2674556 (Paras. 2 and 3, FIGS. 1 to 4)

In the examples of related art described above, with the technology disclosed in Patent Document 1, because a clutch is provided on the generator, increased cost is unavoidable, and, around the predetermined speed at which the clutch goes OFF the clutch comes ON and goes OFF repeatedly so that there remains problem of durability. And, the technology disclosed in Patent Document 2 puts a limit on the output characteristic.

Also, in the technology disclosed in Patent Document 3, when after excitation by a field current is carried out the field current is brought to zero a residual magnetism remains in the field core, and even if the magnetizing force of the permanent magnets has been adjusted, the output at high speeds increases because of this residual magnetism. In particular, when this generator is used as a synchronous motor and made a charging generator cum starter motor, the excitation current becomes large, and when the claw pole type rotor core is manufactured by plastic deformation the residual magnetism also becomes large and output suppression at high speeds becomes difficult, and there remains a danger of the battery becoming over-charged.

SUMMARY OF THE INVENTION

The present invention was made to resolve these kinds of problem, and it is an object of the invention to provide a rotary electric machine for a vehicle using both a coil field and a permanent magnet field for its magnetic field with which there is no over-charging at high speeds.

A rotary electric machine for a vehicle according to the invention has: an armature core constituting a stator having an armature coil for charging a vehicle battery with an output voltage; a rotor core disposed on the inner side of the armature core with a predetermined gap therebetween and made up of magnetic pole parts formed as claw poles so that adjacent magnetic poles are different and a cylindrical part carrying a field coil; and permanent magnets provided in the magnetic circuit of the rotor core for supplying magnetic flux along with the field coil to the armature core, and the magnetizing force of the permanent magnets with respect to the armature core is set so that, at a predetermined speed, the output voltage of the armature coil immediately after a field current is returned to zero from a maximum magnetizing force exerted by the field current does not exceed the charging voltage of the battery.

And, a control device of a rotary electric machine for a vehicle according to the invention has: a rotary electric machine which functions as a charging generator cum starter motor and has an armature core constituting a stator having an armature coil, a rotor core disposed inside the armature core and having magnetic pole parts formed as claw poles so that adjacent magnetic poles are different and a cylindrical part carrying a field coil, and permanent magnets provided in the magnetic circuit of the rotor core for supplying magnetic flux along with the field coil to the armature core; a voltage regulator for controlling the output voltage of the rotary electric machine when it functions as a charging generator by switching ON and OFF a field current; an inverter for converting power from a vehicle battery when the rotary electric machine functions as a starter motor; and control means for controlling the voltage regulator and the inverter, and switching devices of the inverter short-circuit the armature coil when the rotary electric machine functions as a charging generator and at a predetermined speed with the field current at zero the output voltage of the armature coil exceeds the charging voltage of the battery.

DETAILED DESCRIPTION OF THE PREFERRED EMBODIMENTS

First Preferred Embodiment

Figure 1:
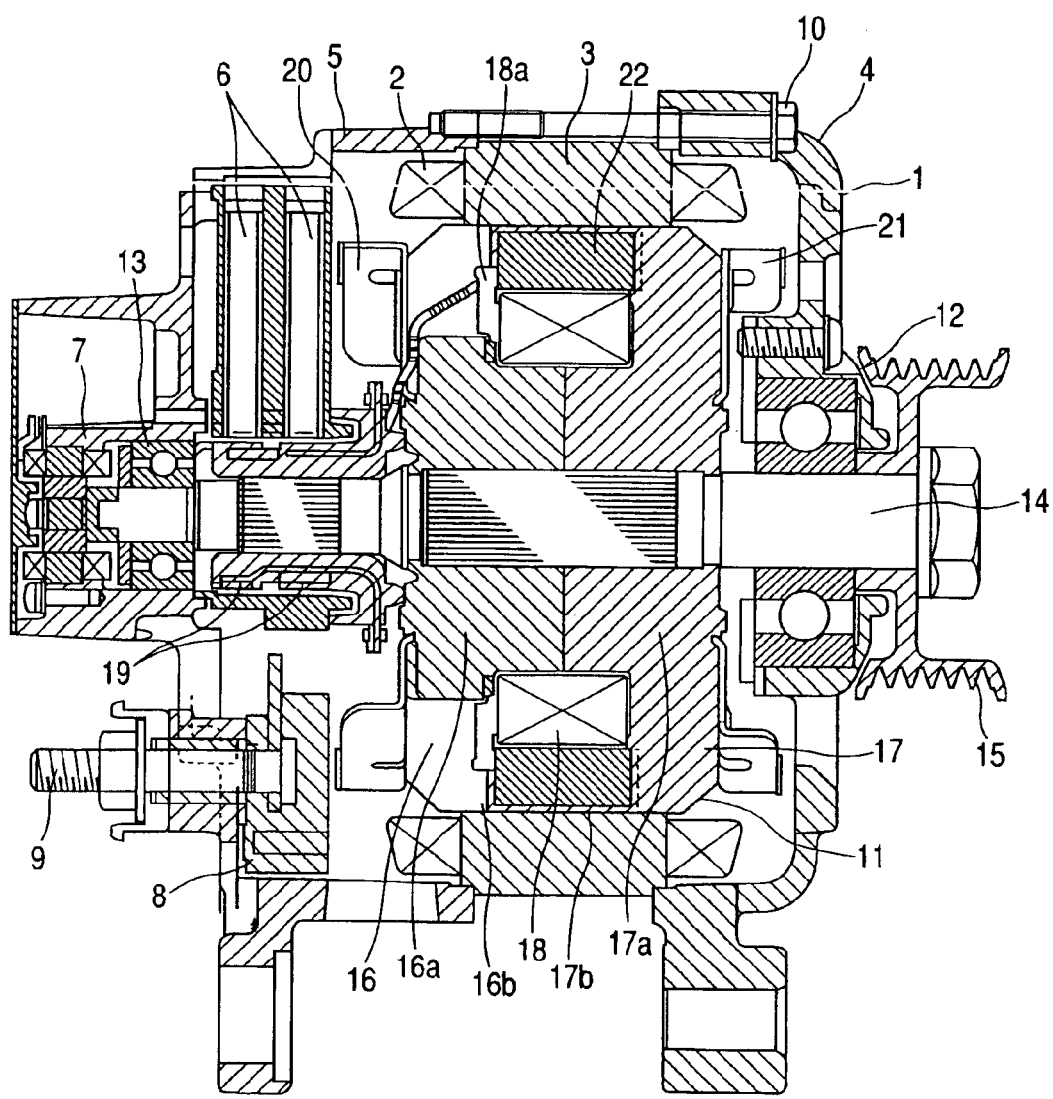
FIG. 1 is a sectional view showing the construction of a rotary electric machine for a vehicle according to a first preferred embodiment of the invention.
Figure 2:
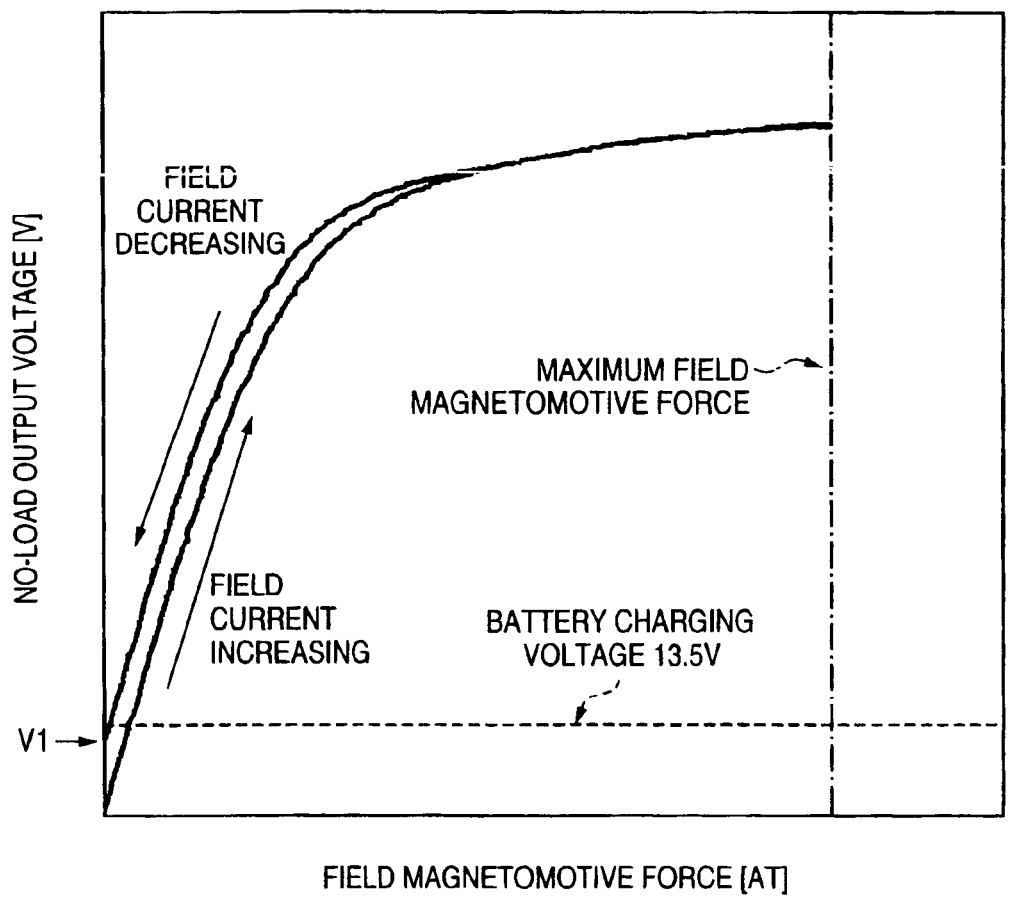
FIG. 2 is a characteristic chart illustrating the rotary electric machine for a vehicle of the first preferred embodiment of the invention.

FIG. 1 is a sectional view showing the construction of a rotary electric machine for a vehicle according to a first preferred embodiment of the invention, and FIG. 2 is a characteristic chart showing a relationship between the magnetomotive force of a field and an output voltage. In FIG. 1, a stator 1 of a rotary electric machine for a vehicle is made up of an armature core 3 having an armature coil 2, and brackets 4 and 5 supporting the armature core 3 from the left and right. A brush holder 6, a sensor 7 for detecting angular position, a board 8 carrying a rectifier (not shown) for rectifying the output of the armature coil 2 and a voltage regulator (not shown) for controlling an output voltage, and a terminal 9 are provided on the bracket 5, and the armature core 3 and the brackets 4 and 5 are integrated by bolts 10.

A rotor 11 is made up of a rotor shaft 14 supported on the brackets 4 and 5 by bearings 12 and 13, a pulley 15 attached to the rotor shaft 14 and driven via a timing belt by an internal combustion engine (not shown), a pair of rotor cores 16 and 17 fixed to the rotor shaft 14, a field coil 18 wound on a bobbin 18a on cylindrical parts 16a and 17a of the rotor cores 16 and 17, and a slip ring 19 for supplying a field current from brushes in the brush holder 6 to the field coil 18, and cooling fans 20 and 21 are attached to both sides of the rotor cores 16 and 17.

The rotor 11 is a claw pole type rotor, and the rotor cores 16 and 17 are made up of the cylindrical parts 16a and 17a carrying the field coil 18 and claw-like magnetic pole parts 16b and 17b facing the inner side of the armature core 3 across a predetermined gap; the pole parts 16b and 17b are formed to a predetermined number of poles and mate with each other so as to cover the outer side of the field coil 18, and the adjacent pole parts 16b and 17b are arrayed at a fixed pitch with predetermined spacings therebetween in the circumferential direction and are magnetized by the field coil 18 so as to become alternately different poles. Permanent magnets 22 are interposed between the adjacent pole parts 16b and 17b, and the permanent magnets 22 are magnetized so as to become the same magnetic poles as the magnetization of the pole parts 16b and 17b by the field coil 18.

In a rotary electric machine for a vehicle according to this first preferred embodiment of the invention constructed as described above, the permanent magnets 22 prevent leakage flux from the field coil 18 between the pole parts 16b and 17b and magnetize the pole parts 16b and 17b to the same magnetic poles as the field coil 18 even when the field current of the field coil 18 is zero. And, the magnetizing force of these permanent magnets 22 on the armature core 3 is set so that when the rotary electric machine rotates at a predetermined speed, the output voltage of the armature coil 2 immediately after the field current flowing through the field coil 18 has returned to zero from its maximum value is less than the charging voltage of the vehicle battery charged by the rotary electric machine.

Explaining this with reference to FIG. 2, FIG. 2 shows the output voltage of the armature coil 2 of when, at a constant speed, from a state wherein there is no residual magnetism in the pole parts 16b and 17b a field current is passed through the field coil 18, and then from the maximum magnetomotive force the field current is reduced to zero, and shows that below roughly the magnetic saturation region of the magnetic circuit a hysteresis arises in the output voltage. That is, even when the field current is made zero a generated voltage v1 due to residual magnetic flux arises, and consequently, in a rotary electric machine provided with permanent magnets 22 between its magnetic poles, the magnetic flux due to the magnetizing force of the permanent magnets 22 is added to this, and at above a certain speed the output voltage of the armature coil 2 exceeds the charging voltage of the battery and at light loads the battery easily becomes overcharged, leading to over-voltage failure of the battery and/or of loads.

With respect to this, in the rotary electric machine for a vehicle of this first preferred embodiment of the invention, the magnetizing force of the permanent magnets 22 is set so that, at a predetermined speed determined from how the vehicle is to be used, as shown in FIG. 2 the output voltage of the armature coil 2 immediately after the field current is returned to zero from the maximum magnetizing force exerted by the field current does not exceed the charging voltage of the battery. That is, because normally the charging voltage of a battery in a vehicle with a 12V electrical system is 13.5V, the output voltage of the armature coil 2 is set to below 13.5V. By setting the magnetizing force of the permanent magnets 22 like this, a rotary electric machine which prevents over-charging of the battery and does not cause over-voltage failure of electrical loads and supplies stable electrical power can be obtained.

Second Preferred Embodiment

Figure 3:
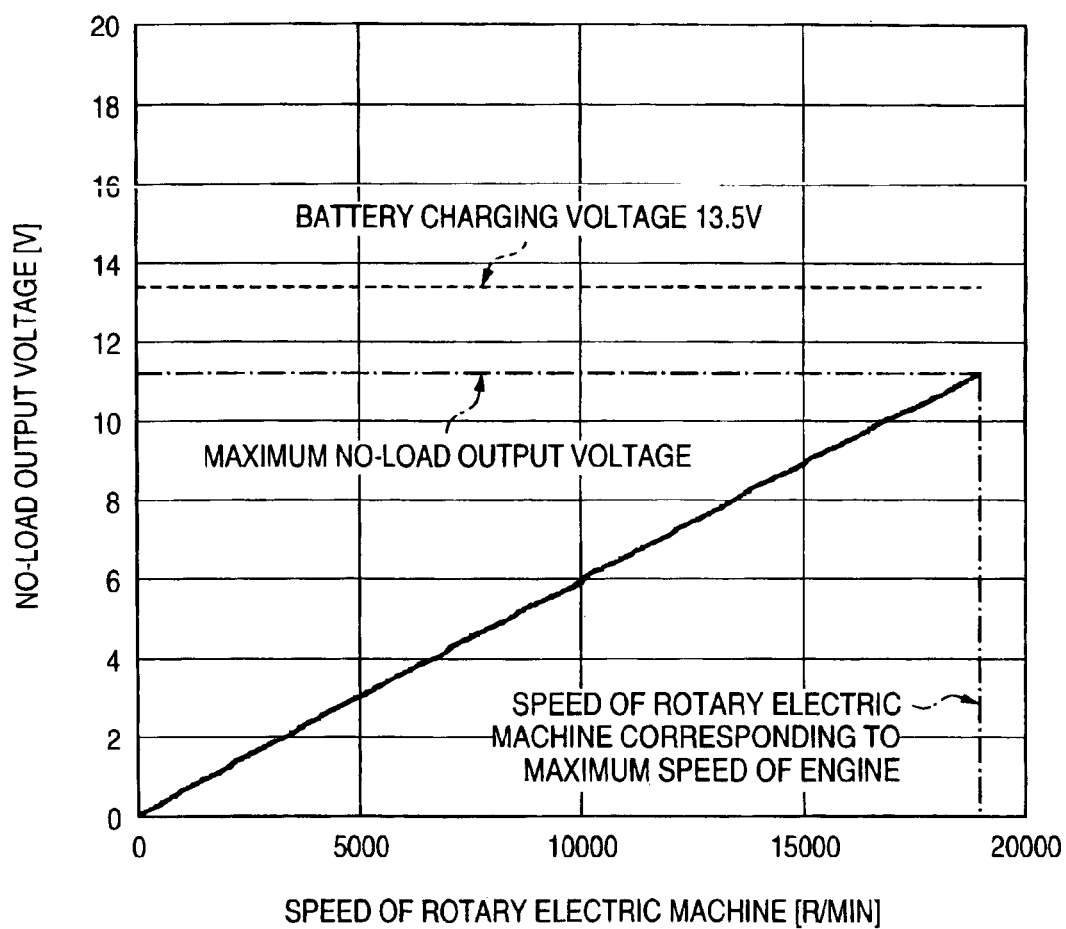
FIG. 3 is a characteristic chart illustrating a rotary electric machine for a vehicle according to a second preferred embodiment of the invention.

FIG. 3 is a characteristic chart showing the characteristic with respect to speed of the generated voltage of a rotary electric machine for a vehicle according to a second preferred embodiment of the invention, in which the construction of the rotary electric machine for a vehicle in this embodiment is the same as in the first preferred embodiment shown in FIG. 1. Here, the magnetizing force of the permanent magnets 22 has been made so that, at the maximum speed of the internal combustion engine, the no-load output voltage of the armature coil 2 immediately after the field current is returned to zero from the maximum magnetizing force exerted by the field current does not exceed the charging voltage of the battery.

FIG. 3 shows this state, and because in a vehicle with a 12V electrical system the charging voltage of the battery is normally 13.5V, if the maximum speed of the internal combustion engine is assumed to be 7,600 rpm and the pulley ratio is assumed to be 2.5, the magnetizing force of the permanent magnets 22 is set so that the generated voltage of the armature coil 2 due to the magnetic flux of the permanent magnets 22 at the speed of the rotary electric machine of 19,000 rpm is below 13.5V. By setting being carried out like this, it becomes possible to obtain a rotary electric machine for a vehicle which prevents over-charging of the battery and does not cause over-voltage failure of electrical loads even at maximum speed immediately after the magnetizing force exerted by the field current has reached its maximum value.

Third Preferred Embodiment

Figure 4:
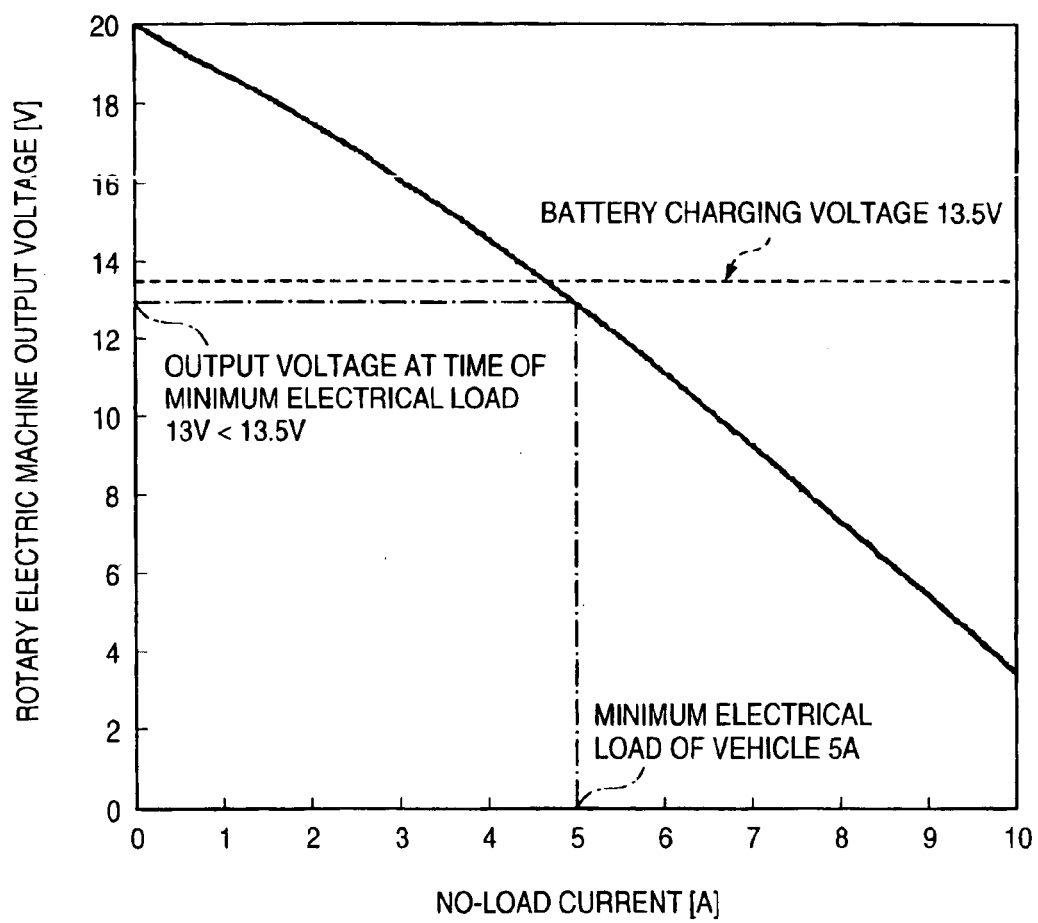
FIG. 4 is a characteristic chart illustrating a rotary electric machine for a vehicle according to a third preferred embodiment of the invention.

FIG. 4 is a characteristic chart illustrating the output characteristic of a rotary electric machine for a vehicle according to a third preferred embodiment of the invention, the construction of the rotary electric machine for a vehicle in this embodiment being the same as in the first preferred embodiment shown in FIG. 1. The magnetizing force of the permanent magnets 22 in this embodiment is set in the following way. That is, the magnetizing force of the permanent magnets 22 is set so that immediately after the field current has returned to zero from the maximum magnetizing force exerted by the field current, when the armature coil 2 of the rotary electric machine outputs a current equal to the load current of the minimum electrical loads necessary to run the internal combustion engine of the vehicle, such as the ignition system, the output voltage of the armature coil 2 does not exceed the charging voltage of the battery.

FIG. 4 shows this, and the output voltage to the load current of the rotary electric machine shows the kind of descending characteristic shown in FIG. 4. Because in a vehicle with a 12V electrical system the charging voltage is normally 13.5V, if it is supposed that the current required by the internal combustion engine at the maximum speed of the rotary electric machine is 5 A, then the magnetizing force of the permanent magnets 22 is set so that immediately after the field current has been returned to zero from the maximum magnetizing force exerted by the field current the output voltage of the armature coil 2 with a load current of 5 A flowing is below 13.5 V. By carrying out setting out like this it is possible to prevent over-voltage failure of electrical loads caused by over-charging of the battery and to exploit effectively the output-increasing effect of the permanent magnets.

Fourth Preferred Embodiment

Figure 5:
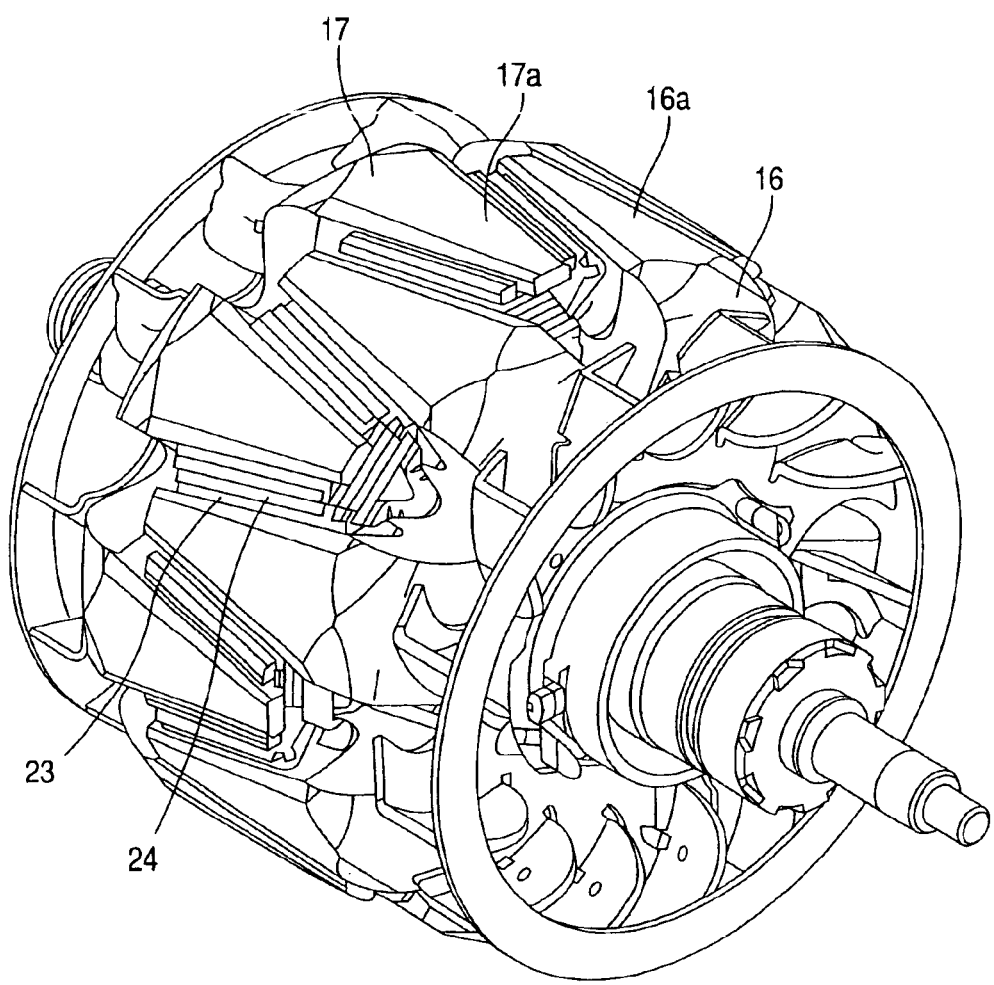
FIG. 5 is a perspective view showing the construction of a rotor of a rotary electric machine for a vehicle according to a fourth preferred embodiment of the invention.

FIG. 5 is a perspective view showing the construction of the rotor of a rotary electric machine for a vehicle according to a fourth preferred embodiment of the invention, wherein parts the same as parts in FIG. 1 of the first preferred embodiment have been given the same reference numerals. As shown in the figure, claw-like pole parts 16b and 17b are arrayed at a predetermined spacing on rotor cores 16 and 17, and permanent magnets 23 are attached by magnet holding members 24 to both of the circumferential direction side faces of each of the pole parts 16b and 17b. Adjacent permanent magnets 23 attached between poles have a space between them, and the permanent magnets 23 are magnetized in such a direction as to prevent leakage of a main flux exerted by a field current.

If they are constructed like this the magnetizing force of the permanent magnets 23 is weakened because there is a space between adjacent permanent magnets 23, the flux from the permanent magnets 23 interlinking with the armature coil 2 from the pole parts 16b and 17b is small, and the output voltage of the armature coil 2 at high speeds can easily be set to a value lower than the charging voltage of the battery. The pole parts 16b and 17b are formed from the rotor cores 16 and 17 by plastic deformation, and their magnetic characteristics change in a direction such that hysteresis increases; however, by adopting the construction of this preferred embodiment it is possible to prevent battery over-charging at high speeds even if the hysteresis is large.

Fifth Preferred Embodiment

Figure 6:
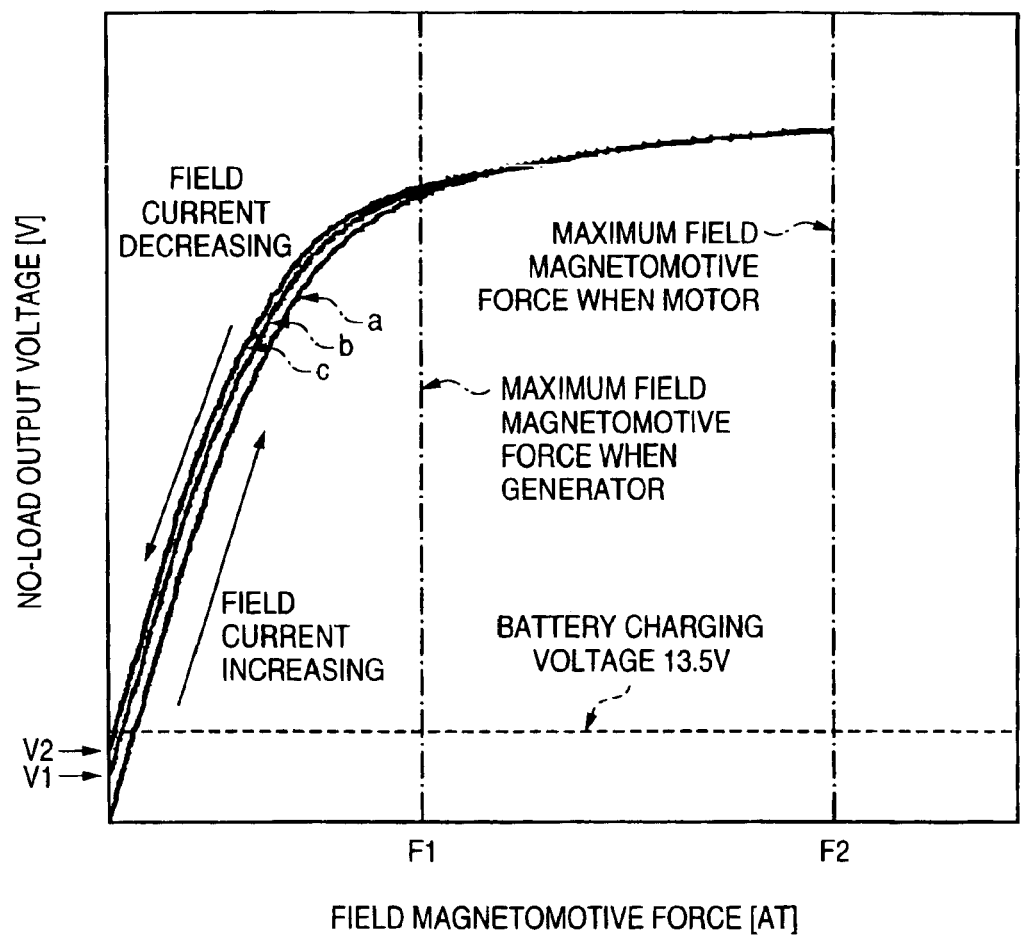
FIG. 6 is a characteristic chart illustrating a rotary electric machine for a vehicle according to a fifth preferred embodiment of the invention.

FIG. 6 is a characteristic chart showing a relationship between field magnetomotive force and output voltage in a rotary electric machine for a vehicle according to a fifth preferred embodiment of the invention, and this preferred embodiment relates to the setting of the magnetomotive force of the permanent magnets 22 when the rotary electric machine for a vehicle of FIG. 1 described in the first preferred embodiment or the rotary electric machine for a vehicle of FIG. 5 described in the fourth preferred embodiment is used as a charging generator cum starter motor and is used as a charging generator after functioning as a starter motor.

In FIG. 6, the characteristic a shows, like FIG. 2 of the first preferred embodiment, with respect to the field magnetomotive force, the output voltage of the armature coil 2 of when, at a fixed speed, a field current is passed through the field coil 18 from a state wherein there is no residual magnetism in the pole parts 16b and 17b. When the rotary electric machine is used as a generator, the field current passed through the field coil 18 is up to the magnetomotive force f1 of FIG. 6, and when from the magnetomotive force f1 the field current is weakened the output voltage with respect to field magnetomotive force becomes as shown by the characteristic b due to hysteresis, so that when the field current has been brought to zero a voltage v1 arises due to residual flux in the armature coil 2.

When the rotary electric machine is used as a starter motor, to obtain a drive torque, the field current passed through the field coil 18 is strengthened to the magnetomotive force f2 in FIG. 6, and the output voltage with respect to field magnetomotive force when the field current is weakend from the magnetomotive force f2 becomes as shown by the characteristic c due to hysteresis so that at field current=zero a voltage v2 due to residual flux arises in the armature coil 2. Accordingly, the generated voltage due to residual flux immediately after starting of the internal combustion engine is high, and to prevent battery over-charging at high speeds the magnetomotive force setting of the permanent magnets 22 should be such that their generated voltage is equivalent to not more than the battery charging voltage−v2.

Sixth Preferred Embodiment

Figure 7:
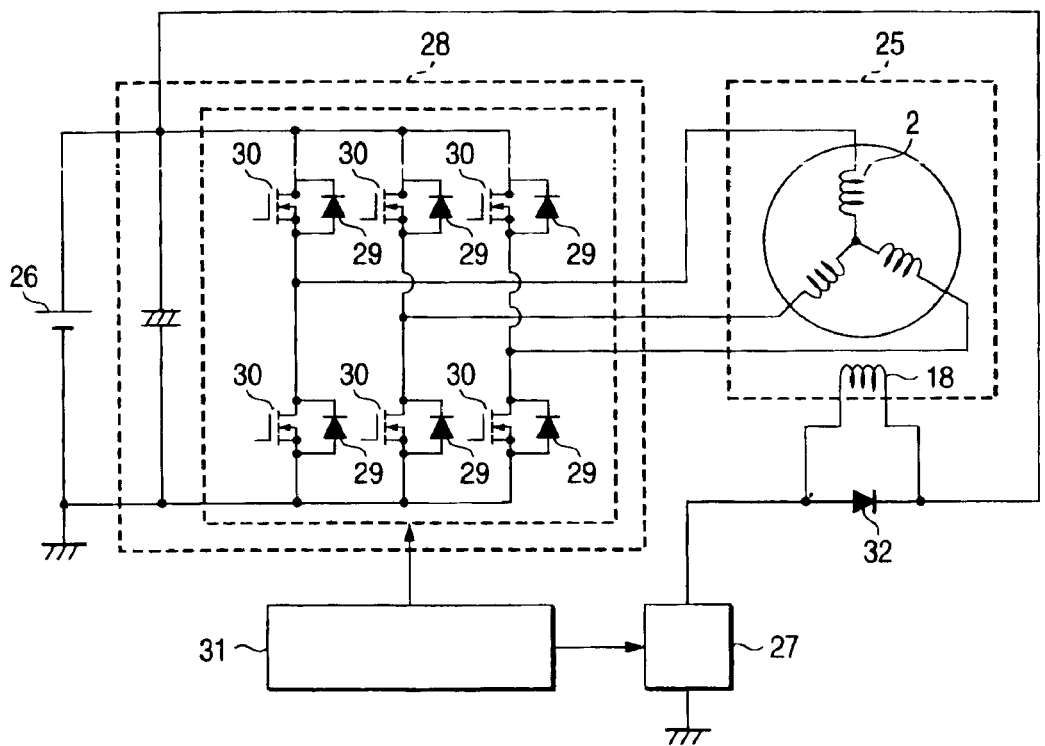
FIG. 7 is a circuit diagram of a control device of a rotary electric machine for a vehicle according to a sixth preferred embodiment of the invention.

FIG. 7 is an outline circuit diagram showing a control device of a rotary electric machine for a vehicle according to a sixth preferred embodiment of the invention, and in this preferred embodiment the rotary electric machine is used as a charging generator cum starter motor as in the fifth preferred embodiment. The rotary electric machine 25 has a three-phase armature coil 2 and a field coil 18; the field coil 18 receives a supply of field current from a vehicle battery 26; this field current is controlled by a voltage regulator 27 and the output voltage of the armature coil 2 is thereby controlled; and permanent magnets (not shown) of the kind described in the first through fifth preferred embodiments are provided in the magnetic circuit of the field.

The three-phase armature coil 2 is connected to the vehicle battery 26 via a power converter 28; when the rotary electric machine 25 functions as a charging generator, the vehicle battery 26 is charged through a group of diodes 29 forming a three-phase full-wave rectifying circuit of the power converter 28; and when the rotary electric machine 25 functions as a starter motor, power is supplied to it from the vehicle battery 26 through a group of transistors 30 forming an inverter of the power converter 28. Control means 31 detects the battery voltage and feeds a signal to the voltage regulator 27 for switching ON and OFF the field current and feeds a PWM signal to the transistors 30 of the inverter for controlling the a.c. power fed to the rotary electric machine 25 serving as a starter motor. A condenser absorbs current ripples and a diode 32 is a flywheel diode.

As mentioned above a field coil 18 and permanent magnets (not shown) are provided in the magnetic field, and so if the magnetomotive force of the permanent magnets were not to be limited as described in the first through fifth preferred embodiments the output voltage of the armature coil 2 would exceed the charging voltage of the battery when the speed of the rotary electric machine 25 exceeds a predetermined value, even when the field current is zero; however, in this preferred embodiment, over-voltage of the battery is detected by the control means 31, and when it is detected that the field current is zero, of the three-phase inverter of the power converter 28, for example an ON signal is fed to the transistors 30 of the lower arms to short-circuit the armature coil 2 and suppress the output voltage.

And, when the control means 31 detects over-voltage of the battery, a current reverse in direction to the normal field current can be passed through the field coil 18 to weaken the field and suppress the output voltage of the armature coil 2. By adopting this kind of construction it is possible to suppress the charging voltage of the battery at high speeds even when the suppression of the magnetomotive force of the permanent magnets provided in the magnetic circuit of the field is insufficient or when the magnetomotive force is not suppressed, and the output of the rotary electric machine 25 can be raised by an amount corresponding to the suppression of the magnetomotive force of the permanent magnets not carried out.

As described above, a rotary electric machine for a vehicle according to this invention has an armature core forming a stator having an armature coil, a rotor core disposed inside the armature core and made up of magnetic pole parts formed as claw-like poles with adjacent poles different and a cylindrical part carrying a field coil, and permanent magnets provided in the magnetic circuit of the magnetic field core for supplying magnetic flux to the armature core along with the field coil, and the magnetizing force of the permanent magnets with respect to the armature core is set so that, at a predetermined speed, the output voltage of the armature coil immediately after the field current is returned to zero from the maximum magnetizing force exerted by the field current does not exceed the charging voltage of the battery; and consequently, whilst an improvement in output owing to the permanent magnets is achieved, the output voltage of the rotary electric machine does not exceed the charging voltage of the battery even if there is residual magnetism in the magnetic circuit of the rotor, over-charging of the battery is prevented, over-voltage failure of electrical loads is avoided, and a rotary electric machine for a vehicle capable of providing a stable power supply can be obtained.

And, a control device of a rotary electric machine for a vehicle according to the invention has a rotary electric machine which functions as a charging generator and a starter motor and has: an armature core having an armature coil, a rotor core having a field coil disposed inside the armature core, and permanent magnets provided in the magnetic circuit of the rotor for applying magnetic flux to the armature core along with the field coil; a voltage regulator for controlling the output voltage when the rotary electric machine functions as a generator by switching ON and OFF the field current; an inverter for converting power from a vehicle battery when the rotary electric machine functions as a motor; and control means for controlling the voltage regulator and the inverter, and switching devices of the inverter are controlled to short-circuit the armature coil when the rotary electric machine functions as a charging generator and at a predetermined speed with the field current at zero the output voltage of the armature coil exceeds the charging voltage of the battery. And consequently, whilst an improvement in output owing to the permanent magnets is achieved, over-charging of the battery at high speeds can be suppressed; the output of the rotary electric machine can be increased; over-charging of the battery can be suppressed even when control of the field current becomes impossible; and it is possible to obtain a highly reliable control device of a rotary electric machine for a vehicle.

What is claimed is:

1. A rotary electric machine for a vehicle, comprising:
    an armature core constituting a stator having an armature coil for charging a vehicle battery with an output voltage;
    a rotor core disposed on the inner side of the armature core with a predetermined gap therebetween and made up of magnetic pole parts formed as claw poles so that adjacent magnetic poles are different and a cylindrical part carrying a field coil; and
    permanent magnets provided in the magnetic circuit of the rotor core for supplying magnetic flux along with the field coil to the armature core,
    wherein the magnetizing force of the permanent magnets with respect to the armature core is set so that, at a predetermined speed, the output voltage of the armature coil immediately after a field current is returned to zero from a maximum magnetizing force exerted by the field current does not exceed the charging voltage of the battery.

2. A rotary electric machine for a vehicle according to claim 1, wherein the predetermined speed is the speed of the rotary electric machine that corresponds to the maximum speed of an internal combustion engine driving the rotary electric machine.

3. A rotary electric machine for a vehicle according to claim 1, wherein the output voltage of the armature coil is set so as not to exceed the charging voltage of the battery when the output current of the armature coil is equal to the minimum current required to run the vehicle.

4. A rotary electric machine for a vehicle according to claim 1, wherein the permanent magnets are disposed on circumferential direction side faces of the claw pole type rotor core pole parts.

5. A rotary electric machine for a vehicle according to claim 1 which serves as both a charging generator and a starter motor, wherein the maximum magnetizing force exerted by the field current is the maximum magnetizing force of when the machine functions as a starter motor.

6. A control device of a rotary electric machine for a vehicle, comprising:

a rotary electric machine which functions as a charging generator cum starter motor and has an armature core constituting a stator having an armature coil, a rotor core disposed inside the armature core and having magnetic pole parts formed as claw poles so that adjacent magnetic poles are different and a cylindrical part carrying a field coil, and permanent magnets provided in the magnetic circuit of the rotor core for supplying magnetic flux along with the field coil to the armature core;

a voltage regulator for controlling the output voltage of the rotary electric machine when it functions as a charging generator by switching ON and OFF a field current;

an inverter for converting power from a vehicle battery when the rotary electric machine functions as a starter motor; and control means for controlling the voltage regulator and the inverter, wherein switching devices of the inverter short-circuit the armature coil when the rotary electric machine functions as a charging generator and at a predetermined speed with the field current at zero the output voltage of the armature coil exceeds the charging voltage of the battery.

7. A control device of a rotary electric machine for a vehicle according to claim 6, wherein when at the predetermined speed and with the field current at zero the output voltage of the armature coil exceeds the charging voltage of the battery, the control means controls the voltage regulator to change the polarity of the field current.

* * * * *